(12) United States Patent
Wanaka

(10) Patent No.: US 8,259,227 B2
(45) Date of Patent: Sep. 4, 2012

(54) SCALING PROCESS SYSTEM, VIDEO OUTPUT APPARATUS AND REPLAY APPARATUS

(75) Inventor: Keiji Wanaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 279 days.

(21) Appl. No.: 12/817,749

(22) Filed: Jun. 17, 2010

(65) Prior Publication Data

US 2010/0321571 A1 Dec. 23, 2010

(30) Foreign Application Priority Data

Jun. 18, 2009 (JP) ................................. 2009-145357

(51) Int. Cl.
*H04N 7/01* (2006.01)
(52) U.S. Cl. ...................................................... 348/448
(58) Field of Classification Search .................. 348/530, 348/538, 539, 441, 448, 449, 458, 459, 581, 348/699; 382/161, 167, 278, 300
See application file for complete search history.

(56) References Cited

U.S. PATENT DOCUMENTS

| | | | | |
|---|---|---|---|---|
| 6,567,544 B1 * | 5/2003 | Kanno et al. | .................. | 382/169 |
| 6,903,749 B2 * | 6/2005 | Soo et al. | ...................... | 345/605 |
| 6,907,073 B2 * | 6/2005 | Sawhney et al. | ......... | 375/240.14 |
| 7,200,278 B2 * | 4/2007 | Long et al. | ..................... | 382/266 |
| 8,041,110 B2 * | 10/2011 | Hasegawa | ..................... | 382/167 |
| 8,060,659 B2 * | 11/2011 | Ichieda | .............................. | 710/5 |
| 8,125,524 B2 * | 2/2012 | Znamenskiy et al. | ........ | 348/180 |
| 8,159,606 B2 * | 4/2012 | Sole et al. | ..................... | 348/441 |
| 2010/0054621 A1 * | 3/2010 | Qi et al. | ........................ | 382/260 |

FOREIGN PATENT DOCUMENTS

| | | |
|---|---|---|
| JP | 2008-67024 A | 3/2008 |
| JP | 2008-78867 A | 4/2008 |

\* cited by examiner

*Primary Examiner* — Paulos Natnael
(74) *Attorney, Agent, or Firm* — Crowell & Moring LLP

(57) ABSTRACT

Disclosed is a scaling process system including a replay apparatus and a video output apparatus which are connected via a HDMI, wherein each of the video output apparatus and the replay apparatus respectively comprises a between-pixel interpolation method table for deciding a superiority/inferiority of a between-pixel interpolation method which is used when carrying out a scaling process in the scaling process system, wherein the video output apparatus including a version request signal transmission device, a version information receiving device, a determining device, a control device, a between-pixel interpolation method table receiving device and a first update execution device, wherein the replay apparatus including a version request signal receiving device, a version information return device, a receiving device, a between-pixel interpolation method table transmission device and a second update executing device.

5 Claims, 10 Drawing Sheets

FIG.3A

VERSION INFORMATION : VER. 1 — T1

| IDENTIFIER | PIXEL INTERPOLATION METHOD TYPE | ORDER OF SUPERIORITY |
|---|---|---|
| ○ | A | 1 |
|  | B | 2 |
|  | C | 3 |
|  | D | 4 |

FIG.3B

VERSION INFORMATION : VER. 1

| IDENTIFIER | PIXEL INTERPOLATION METHOD TYPE | ORDER OF SUPERIORITY |
|---|---|---|
| ○ | A | 1 |
|  | B | 2 |
|  | C | 3 |
|  | D | 4 |

(BEFORE UPDATE)

↓

VERSION INFORMATION : VER. 2

| IDENTIFIER | PIXEL INTERPOLATION METHOD TYPE | ORDER OF SUPERIORITY |
|---|---|---|
| ○ | A | 2 |
|  | B | 4 |
|  | C | 5 |
|  | D | 6 |
|  | E | 1 |
|  | F | 3 |

(AFTER UPDATE)

FIG.4

PIXEL INTERPOLATION METHOD TABLE "VER. 1" OF REPLAY APPARATUS

↕ COMPARE

| VERSION INFORMATION : VER. 2 | | |
|---|---|---|
| IDENTIFIER | PIXEL INTERPOLATION METHOD TYPE | ORDER OF SUPERIORITY |
|  | A | 2 |
|  | B | 4 |
|  | C | 5 |
|  | D | 6 |
| O | E | 1 |
|  | F | 3 |

PIXEL INTERPOLATION METHOD "A" OF REPLAY APPARATUS
↕ COMPARE

| VERSION INFORMATION : VER. 2 | | |
|---|---|---|
| IDENTIFIER | PIXEL INTERPOLATION METHOD TYPE | ORDER OF SUPERIORITY |
|  | A | 2 |
|  | B | 4 |
|  | C | 5 |
|  | D | 6 |
| O | E | 1 |
|  | F | 3 |

T2

SCALING PROCESS SYSTEM, VIDEO OUTPUT APPARATUS AND REPLAY APPARATUS

BACKGROUND OF THE INVENTION

1. Field of the Invention

The present invention relates to a scaling process system which optimally carries out a scaling process of an image, a video output apparatus and a replay apparatus.

2. Description of Related Art

There are various types of formats such as NTSC (National Television System Committee), PAL (Phase Alternating Line), high-vision, personal computer signal and the like for video signals. When video signals of such various types of formats are to be displayed in a display which has various numbers of pixels, there is a need to carry out a scaling process to convert the signal format in accordance with the number of pixel of each display.

Conventionally, as a between-pixel interpolation method which is a technique of scaling process of a digital video, for example, a linear interpolation method, a three-dimensional interpolation method, a spline interpolation method and the like are known. In these methods, pixels which are uniformly processed by an interpolation filter from neighboring pixels are added between the original pixels.

Further, in recent year, HDMI (High Definition Multimedia Interface) is widely used as a digital interface for video transmission between AV devices (for example, see JP2008-67024 and JP2008-78867). In HDMI, a CEC (Consumer Electronics Control) line which can send and receive data in both directions is standardized.

Conventionally, a plurality of cables for each signal of video, audio and control have been used for connection between devices. However, in HDMI, only one cable is used and the control signal is transmitted in both directions. Therefore, for example, by relaying the control signal to the output apparatus such as STB, DVD player and the like connected by HDMI from a display of a television receiver, the entire AV system such as a home theater can be operated by one remote controller.

When carrying out a scaling process between AV (Audio Visual) devices which are connected by CEC of HCMI such as a DVD recorder and a television receiver, for example, it is preferable to carry out the scaling process by using a device which can execute the between-pixel interpolation method in the highest performance among the devices.

However, because there is no unequivocal evaluation for superiority/inferiority of between-pixel interpolation methods, there is a problem that which of the DVD recorder or the television receiver has higher performance, that is, which of the devices is preferable for carrying out the scaling process cannot be determined.

SUMMARY OF THE INVENTION

It is, therefore, a main object of the present invention to provide a scaling process system which can appropriately determine the device which is suited fro the scaling process among a plurality of devices which are connected via HDMI, a video output apparatus and a replay apparatus.

According to a first aspect of the present invention, there is provided a scaling process system including a replay apparatus and a video output apparatus which are connected via a HDMI, wherein each of the video output apparatus and the replay apparatus respectively includes a between-pixel interpolation method table for deciding a superiority/inferiority of a between-pixel interpolation method which is used when carrying out a scaling process in the scaling process system, wherein the video output apparatus includes a version request signal transmission device to transmit a version request signal for requesting version information of the between-pixel interpolation method table of the replay apparatus to the replay apparatus, a version information receiving device to receive the version information of the between-pixel interpolation method table of the replay apparatus which is returned from the replay apparatus in response to the version request signal, a determining device to compare the version information of the between-pixel interpolation method table of the replay apparatus which is received by the version information receiving device with version information of the between-pixel interpolation method table of the video output apparatus to determine which of the between-pixel interpolation method table of the replay apparatus or the between-pixel interpolation method table of the video output apparatus is newer, a control device to transmit the between-pixel interpolation method table of the video output apparatus to the replay apparatus when the between-pixel interpolation method table of the video output apparatus is determined as being newer by the determining device and to transmit a control signal for transmitting the between-pixel interpolation method table of the replay apparatus to the video output apparatus to the replay apparatus when the between-pixel interpolation method table of the replay apparatus is determined as being newer by the determining device, a between-pixel interpolation method table receiving device to receive the between-pixel interpolation method table which is transmitted by the replay apparatus in response to the control signal and a first update execution device to execute an update of an existing between-pixel interpolation method table by using the received between-pixel interpolation method table when the between-pixel interpolation method table of the replay apparatus is received by the between-pixel interpolation method table receiving device, wherein the replay apparatus includes a version request signal receiving device to receive the version request signal which is transmitted by the version request signal transmission device of the video output apparatus, a version information return device to return the version information of the between-pixel interpolation method table of the replay apparatus in response to the version request signal to the video output apparatus, a receiving device to receive the between-pixel interpolation method table or the control signal which is transmitted by the control device, a between-pixel interpolation method table transmission device to transmit the between-pixel interpolation table to the video output apparatus when the control signal is received by the receiving device and a second update executing device to execute an update of an existing between-pixel interpolation method table by using the received between-pixel interpolation method table when the between-pixel interpolation method table of the video output apparatus is received by the receiving device.

According to a second aspect of the present invention, there is provided a scaling process system comprising a replay apparatus and a video output apparatus which are connected via a HDMI, wherein each of the video output apparatus and the replay apparatus respectively includes a between-pixel interpolation method table for deciding a superiority/inferiority of a between-pixel interpolation method which is used when carrying out a scaling process in the scaling process system, wherein the replay apparatus includes a version request signal transmission device to transmit a version request signal for requesting version information of the between-pixel interpolation method table of the video output apparatus to the video output apparatus, a version information receiving device to receive the version information of the between-pixel interpolation method table of the video output apparatus which is returned from the video output apparatus in response to the version request signal, a determining device to compare the version information of the between-pixel interpolation method table of the video output apparatus which is received by the version information receiving device with version information of the between-pixel interpolation method table of the replay apparatus to determine which of the between-pixel interpolation method table of the video output apparatus or the between-pixel interpolation method table of the replay apparatus is newer, a control device to transmit the between-pixel interpolation method table of the replay apparatus to the video output apparatus when the between-pixel interpolation method table of the replay apparatus is determined as being newer by the determining device and to transmit a control signal for transmitting the between-pixel interpolation method table of the video output apparatus to the replay apparatus to the video output apparatus when the between-pixel interpolation method table of the video output apparatus is determined as being newer by the determining device, a between-pixel interpolation method table receiving device to receive the between-pixel interpolation method table which is transmitted by the video output apparatus in response to the control signal and a first update execution device to execute an update of an existing between-pixel interpolation method table by using the received between-pixel interpolation method table when the between-pixel interpolation method table of the video output apparatus is received by the between-pixel interpolation method table receiving device, wherein the video output apparatus including a version request signal receiving device to receive the version request signal which is transmitted by the version request signal transmission device of the replay apparatus, a version information return device to return the version information of the between-pixel interpolation method table of the video output apparatus in response to the version request signal to the replay apparatus, a receiving device to receive the between-pixel interpolation method table or the control signal which is transmitted by the control device, a between-pixel interpolation method table transmission device to transmit the between-pixel interpolation table to the replay apparatus when the control signal is received by the receiving device and a second update executing device to execute an update of an existing between-pixel interpolation method table by using the received between-pixel interpolation method table when the between-pixel interpolation method table of the replay apparatus is received by the receiving device.

According to a third aspect of the present invention, there is provided a video output apparatus which is connected with a replay apparatus via a HDMI including a between-pixel interpolation method table to decide a superiority/inferiority of a between-pixel interpolation method which is used when carrying out a scaling process, a version request signal transmission device to transmit a version request signal for requesting version information of the between-pixel interpolation method table of the replay apparatus to the replay apparatus, a version information receiving device to receive the version information of the between-pixel interpolation method table of the replay apparatus which is returned from the replay apparatus in response to the version request signal, a determining device to compare the version information of the between-pixel interpolation method table of the replay apparatus which is received by the version information receiving device with version information of the between-pixel interpolation method table of the video output apparatus to determine which of the between-pixel interpolation method table of the replay apparatus or the between-pixel interpolation method table of the vide output apparatus is newer, a control device to transmit the between-pixel interpolation method table of the video output apparatus to the replay apparatus when the between-pixel interpolation method table of the video output apparatus is determined as being newer by the determining device and to transmit a control signal for transmitting the between-pixel interpolation method table of the replay apparatus to the video output apparatus to the replay apparatus when the between-pixel interpolation method table of the replay apparatus is determined as being newer by the determining device, a between-pixel interpolation method table receiving device to receive the between-pixel interpolation method table which is transmitted by the replay apparatus in response to the control signal and an update execution device to execute an update of an existing between-pixel interpolation method table by using the received between-pixel interpolation method table when the between-pixel interpolation method table of the replay apparatus is received by the between-pixel interpolation method table receiving device.

According to a fourth aspect of the present invention, there is provided a replay apparatus which is connected with a video output apparatus via a HDMI including a version request signal transmission device to transmit a version request signal for requesting version information of the between-pixel interpolation method table of the video output apparatus to the video output apparatus, a version information receiving device to receive the version information of the between-pixel interpolation method table of the video output apparatus which is returned from the video output apparatus in response to the version request signal, a determining device to compare the version information of the between-pixel interpolation method table of the video output apparatus which is received by the version information receiving device with version information of the between-pixel interpolation method table of the replay apparatus to determine which of the between-pixel interpolation method table of the video output apparatus or the between-pixel interpolation method table of the replay apparatus is newer, a control device to transmit the between-pixel interpolation method table of the replay apparatus to the video output apparatus when the between-pixel interpolation method table of the replay apparatus is determined as being newer by the determining device and to transmit a control signal for transmitting the between-pixel interpolation method table of the video output apparatus to the replay apparatus to the video output apparatus when the between-pixel interpolation method table of the video output apparatus is determined as being newer by the determining device, a between-pixel interpolation method table receiving device to receive the between-pixel interpolation method table which is transmitted by the video output apparatus in response to the control signal and an update execution device to execute an update of an existing between-pixel interpolation method table by using the received between-pixel interpolation method table when the between-pixel interpolation method table of the video output apparatus is received by the between-pixel interpolation method table receiving device.

According to the present invention, in a scaling process system including an output apparatus and a display apparatus which are connected via HDMI, performance of each of the between-pixel interpolation method can be recognized by each other by making the between-pixel interpolation method tables of the replay apparatus and the video output apparatus be the same. Therefore, the device which is suited for the scaling process can be determined appropriately.

Therefore, the original image quality can be maintained in time of scaling process and even higher image quality can be realized.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3A is a diagram of an example showing a between-pixel interpolation method table;

FIG. 3B is a diagram for explaining an update of the between-pixel interpolation method table;

FIG. 4 is a diagram for explaining a comparison of version information of between-pixel interpolation method tables;

FIG. 5 is a diagram for explaining a comparison of between-pixel interpolation methods of the replay apparatus and the video output apparatus;

DESCRIPTION OF THE REFERRED EMBODIMENTS

Figure 1:
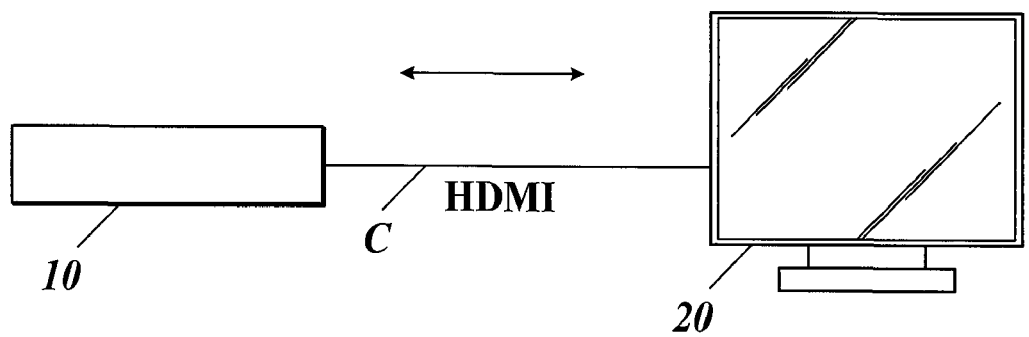
FIG. 1 is a schematic diagram of a scaling process system of the present invention.

Hereinafter, embodiments of the present invention will be described with reference to the drawings. Here, the scope of the invention is not limited to the examples shown in the drawings.

First Embodiment

As shown in FIG. 1, the scaling process system 1 includes a replay apparatus 10 and a video output apparatus 2.

The replay apparatus 10 and the video output apparatus 20 are connected to each other with a HDMI cable C of HDMI (High Definition Multimedia Interface) standard. Further, video data and audio data are transmitted to the video output apparatus 20 side from the replay apparatus 10 with control signal by the HDMI.

First, structure of the replay apparatus 10 will be described.

For example, the replay apparatus 10 is a DVD recorder which carries out replay of video data and the like recorded in DVD (Digital Versatile Disc).

Figure 2:
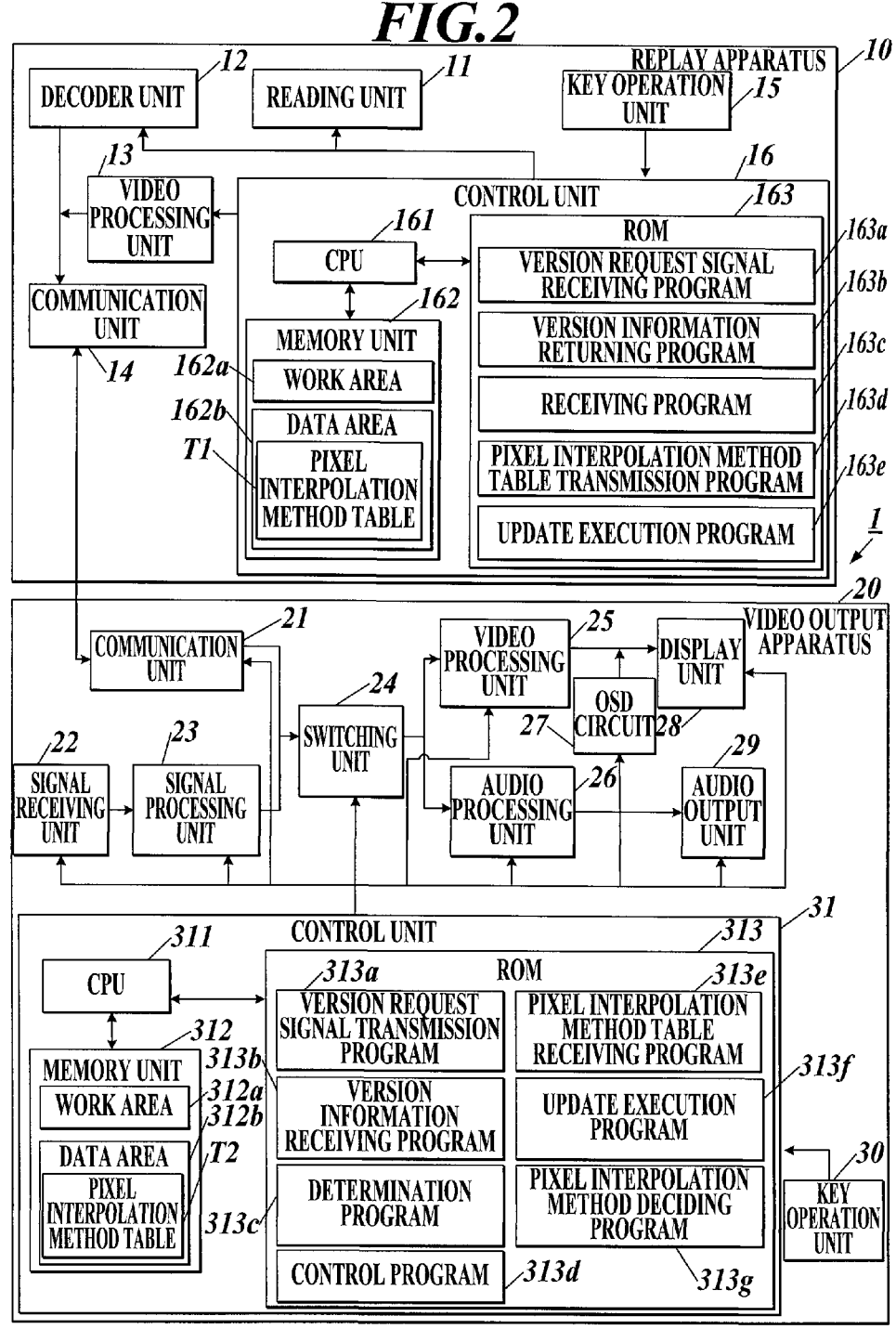
FIG. 2 is a block diagram showing a control structure of a replay apparatus and a video output apparatus in the scaling process system of the first embodiment.

As shown in FIG. 2, the replay apparatus 10 is connected with the video output apparatus 10 which displays video based on the video data which is to be replayed in the replay apparatus 10 by the HDMI cable C. Further, the replay apparatus 10 transmits various types of data such as video data of video to be replayed to the video output apparatus 20 via the HDMI cable C.

For example, the replay apparatus 10 includes a reading unit 11, a decoder unit 12, a video processing unit 13, a communication unit 14, a key operation unit 15, a control unit 16 to integrally control the above each part and the like.

For example, the reading unit 11 reads out contents data which is recorded in DVD (omitted from drawing) and outputs the read contents data to the decoder unit 12.

In particular, the reading unit 11 reads out contents data which is recorded in DVD and outputs the read contents data to the decoder unit 12 by irradiating laser beam to the reflecting layer of DVD and by generating a voltage signal according to the reflection light by an opto-electric conversion and a current/voltage conversion, for example.

The decoder unit 12 carries out a predetermined decode process to the contents data which is read out in the reading unit 11.

In particular, for example, the decoder unit 12 includes a separator, a video decoder, an audio decoder (all of which are omitted from the drawing) and the like, and the contents data which is inputted from the reading unit 11 is separated into a plurality of data such as video data, audio data, a sub-video data and the like in the separator and the separated video data is outputted to the video decoder and the separated audio data is outputted to the audio decoder. Further, in the video decoder, the separated video data is decoded in accordance with the MPEG form in the video decoder and the separated audio data is decoded in accordance with the MPEG audio form in the audio decoder.

The video processing unit 13 carries out a predetermined scaling process to the video data which is outputted from the decoder unit 12.

In particular, for example, the video processing unit 13 includes LSI (Large Scale Integration) and the like, and when an instruction to execute the scaling process is given by the after mentioned control unit 31 of the video output apparatus 20, the video processing unit 13 carries out the scaling process to the video data which is outputted from the decoder unit 12 in response to the instruction.

The communication unit 14 transmits various types of data which are outputted from the video processing unit 13 and the decoder unit 12 to an external device such as a video output apparatus 20 or the like with control signal.

In particular, the communication unit 14 includes a HDMI terminal corresponding to HDMI, and the communication unit 14 is connected with the video output apparatus 20 by the HDMI cable C.

The HDMI cable C includes a CEC line to communicate CEC (Consumer Electronics Control) signal and a video/audio line to communicate video/audio signal.

The CEC line is structured so that data communication can be carried out in both ways so that the CEC signal can be sent and received between each of the control units 16 and 13 of the replay apparatus 10 and the video output apparatus 20, respectively. The video/audio line carries out transmission of the video/audio signal to the video output apparatus 20 from the replay apparatus 10 via the communication units 14 and 21.

The CEC is structured with a general-purpose vendor command which is common for each company to control power, input switching and the like and an optional vendor command which can be uniquely defined by each manufacturer.

In the embodiment, sending and receiving of data of various types of information in both ways is executed by using the CEC vendor command of HDMI. Data of various types of information to be sent and received by using the CEC vendor command are version information of between-pixel interpolation method tables T1 and T2 each of which is included in the replay apparatus 10 and the video output apparatus 20, respectively, the between-pixel interpolation method tables T1 and T2 and between-pixel interpolation method information of the replay apparatus 10 and the video output apparatus 20 and the like. The details will be described later.

The key operation unit 15 is used when a user inputs various types of instructions.

In particular, for example, the key operation unit 15 includes a plurality of keys for a user to input various types of instructions, and when a key is pushed and operated by a user, the input operation signal corresponding to the pushed key is outputted to the control unit 16.

The control unit 16 includes a CPU (Central Processing Unit) 161, a memory unit 162, a ROM (Read Only Memory) 163 and the like.

The CPU 161 executes various types of programs which are stored in the ROM 163 according to the input signals inputted from each part of the replay apparatus 10, the input operation signals based on the pushing operation of various types of keys in the key operation unit 15, and also, the CPU 161 integrally controls the overall operation of the replay apparatus 10 by outputting output signal to each part of the replay apparatus 10 based on the program for execution.

For example, the memory unit 162 includes a work area 162a which is structured of a volatile memory such as a RAM (Random Access Memory) and a data area 162b which is structured of a non-volatile memory such as an EPROM (Erasable Programmable ROM).

The work area 162a stores processing results which are generated when executing various types of programs by the CPU 161, the inputted data and the like.

The data area 162b stores the between-pixel interpolation method table T1 for deciding superiority/inferiority of the between-pixel interpolation method at the time of scaling process in the scaling process system 1.

In the between-pixel interpolation method table T1, items of "between-pixel interpolation method type" and items of "order of superiority" are stored so as to be corresponded to each other.

That is, in the between-pixel interpolation table T1, at least one or more types of between-pixel interpolation methods are stored in the item of "between-pixel interpolation method type", and numbers for deciding the superiority/inferiority are allocated as "order of superiority" when a plurality of types of between-pixel interpolation methods are stored.

Further, the between-pixel interpolation method table T1 includes an identifier to select any one of the stored between-pixel interpolation methods and the between-pixel interpolation method which is to be executed in the replay apparatus 10 can be identified. The identified between-pixel interpolation method is to be referred to by the control unit 16 in time of execution of the after mentioned between-pixel interpolation method deciding program 313g.

Moreover, version information which indicates the version of the between-pixel interpolation method table T1 is added to the between-pixel interpolation method table T1.

The version information is to be referred to by the control unit 16 in time of execution of the after-mentioned version information return program 163b.

In particular, as shown in FIG. 3A, the between-pixel interpolation method table T1 stores four types of between-pixel interpolation methods, that are A, B, C and D, as the "between-pixel interpolation method type", for example, and each of numbers 1 to 4 is allocated corresponding to each method as the "order of superiority". Further, "A" which is the between-pixel interpolation method to be executed in the replay apparatus 10 is identified.

Moreover, the version information which shows that the between-pixel interpolation method table T1 is version 1 is added as "Ver. 1" in the between-pixel interpolation table T1.

Here, for example, between-pixel interpolation method types are various types of known between-pixel interpolation methods such as linear interpolation method, three-dimensional interpolation method, spline interpolation method and the like, in particular. Further, order of superiority of these methods is set in advance and is stored in the memory unit 162a.

For example, the ROM 163 includes a program storage area which is formed of a non-volatile memory and stores the version request signal receiving program 163a, the version information return program 163b, the receiving program 163c, the between-pixel interpolation method table transmission program 163d, the update execution program 163e and the like.

For example, the version request signal receiving program 163a is a program to make the CPU 161 realize a function to receive a version request signal for requesting version information of the between-pixel interpolation method table T1 of the replay apparatus 10.

In particular, when the version request signal is transmitted from the video output apparatus 20 by the execution of the after-mentioned version request signal transmission program 313a of the video output apparatus 20, the CPU 161 receives the version request signal by executing the version request signal receiving program 163a.

The CPU 161 functions as the version request signal receiving device along with the communication unit 14 by executing the version request signal receiving program 163a.

For example, the version information return program 163b is a program to make the CPU 161 realize a function to return the version information of the between-pixel interpolation method table T1 of the replay apparatus 10 to the video output apparatus 20.

In particular, when the version request signal is received by the execution of the version request signal receiving program 163a, the CPU 161 replies to the version request signal and refers to the between-pixel interpolation method table T1 which is stored in the data area 162b of the memory unit 162 to extract the version information of the between-pixel interpolation method table T1 of the replay apparatus 10. Then, the CPU 161 returns the extracted version information to the video output apparatus 20.

For example, in an example of FIG. 3A, the CPU 161 refers to the between-pixel interpolation method table T1 to extract "Ver. 1" as version information and thereafter, returns the "Ver. 1" to the video output apparatus 20.

At this time, the CPU 161 returns the version information by using the CEC vendor command of HDMI.

The CPU 161 functions as the version information return device along with the communication unit 14 by executing the version information return program 163b.

For example, the receiving program 163c is a program to make the CPU 161 realize a function to receive a control signal for transmitting the between-pixel interpolation method table T2 which is transmitted from the video output apparatus 20 or the between-pixel interpolation method table T1 of the replay apparatus 10 to the video output apparatus 20 by executing the after-mentioned control program 313d of the video output apparatus 20.

In particular, when the between-pixel interpolation method table T2 is determined as being newer comparing to the between-pixel interpolation method table T1 by the execution of the after-mentioned determining program 313c of the video output apparatus 20, the between-pixel interpolation method table T2 is transmitted to the replay apparatus 10 from the video output apparatus 20 by the execution of the after-mentioned control program 313d of the video output apparatus 20.

When the between-pixel interpolation method table T2 is received, the CPU 161 stores the received between-pixel interpolation method table T1 in the data area 162b of the memory unit 162.

On the other hand, when the between-pixel interpolation method table T1 is determined as being newer comparing to the between-pixel interpolation method table T2 by the execution of the after-mentioned determining program 313c of the video output apparatus 20, a control signal is transmitted to the replay apparatus 10 from the image output apparatus 20 by the execution of the after-mentioned control program 313d of the video output apparatus 20.

The CPU 161 functions as the receiving device along with the communication unit 14 by executing the receiving program 163c.

For example, the between-pixel interpolation method table transmission program 163d is a program to make the CPU 161 realize a function to transmit the between-pixel interpolation method table T1 to the video output apparatus 20 when the control signal is received from the video output apparatus 20 by the execution of the receiving program 163c.

In particular, when the control signal is received by the execution of the receiving program 163c, the CPU 161 replies to the control signal and extracts the between-pixel interpolation method table T1 which is stored in the data area 162b of the memory unit 162 to transmit the extracted between-pixel interpolation method table T1 to the video output apparatus 20.

At this time, the CPU 161 transmits the between-pixel interpolation method table T1 by using the CEC vendor command of HDMI.

The CPU 161 functions as the between-pixel interpolation method table transmission device along with the communication unit 14 by executing the between-pixel interpolation method table transmission program 163d.

For example, the update execution program 163e is a program to make the CPU 161 realize a function to execute an update of the existing between-pixel interpolation method table T1 by using the received between-pixel interpolation method table T2 when the between-pixel interpolation method table T2 is received from the video output apparatus 20 by the execution of the receiving program 163c.

In particular, when the between-pixel interpolation method table T2 is received by the execution of the receiving program 163c, the CPU 161 compares the between-pixel interpolation method table T2 with the existing between-pixel interpolation method table T1 to extract methods which are not stored as the "between-pixel interpolation method type" of the between-pixel interpolation method table T1 among the "between-pixel interpolation method type" of the between-pixel interpolation method table T2, and adds the extracted methods to the "between-pixel interpolation method type" of the between-pixel interpolation method table T1. Thereafter, the CPU 161 reallocates the order of superiority of the between-pixel interpolation methods according to the regular order of superiority.

That is, the CPU 161 updates the table (between-pixel interpolation method table T1) of old version in accordance with the table (between-pixel interpolation method table T2) of new version.

FIG. 3B is a diagram showing an example where the between-pixel interpolation method table of Ver. 1 is updated to the between-pixel interpolation method table of Ver. 2.

In the between-pixel interpolation method table of Ver. 1, four types of between-pixel interpolation method types, which are A to D, are stored. On the other hand, in the between-pixel interpolation method table of Ver. 2, six types of between-pixel interpolation method types, which are A to F, are stored.

Here, two types of between-pixel interpolation methods, E and F, which are not stored in the table of Ver. 1 are to be added to the table in time of update.

Further, when the order of superiority of the between-pixel interpolation method is E>A>F>B>C>D>, for example, each of the orders 1, 2, 3 and 4 is orderly allocated to the between-pixel interpolation method of A, B, C and D, respectively, in the between-pixel interpolation method table of Ver. 1. However, when updated, each of the orders 2, 4, 5, 6, 1, and 3 is orderly allocated to the between-pixel interpolation method of A, B, C, D, E and F, respectively.

Therefore, for example, the order of superiority of the between-pixel interpolation method "A" changes to "2" from "1".

The CPU 161 functions as the second update execution device along with the communication unit 14 by executing the update execution program 163e.

Next, structure of the video output apparatus 20 will be described.

For example, the video output apparatus 20 is a television receiver for displaying video based on video data and the like inputted from a television broadcasting station or an external device such as the replay apparatus 10.

As shown in FIG. 2, the video output apparatus 20 is connected with the replay apparatus 10 which inputs various types of data such as video data and the like by the HDMI cable C. Further, the video output apparatus 20 displays video based on the video data which is inputted from the replay apparatus 10 via the HDMI cable C.

The video output apparatus 20 includes a communication unit 21, a signal receiving unit 22, a signal processing unit 23, a switching unit 24, a video processing unit 25, an audio processing unit 26, an OSD (On Screen Display) circuit 27, a display unit 28, an audio output unit 29, a key operation unit 30, a control unit 31 for integrally controlling each of the above parts and the like.

The communication unit 21 receives video data and the like which are transmitted from an external device such as the replay apparatus 10.

In particular, the communication unit 21 includes a HDMI terminal corresponding to HDMI, and the communication unit 21 is connected to the replay apparatus 10 by the HDMI cable C.

The communication unit 21 receives video data and audio data which are transmitted with a control signal from the communication unit 14 of the replay apparatus 10 via the CEC line and the video/audio line of the HDMI cable C.

The signal receiving unit 22 includes an antenna/tuner and the like and receives broadcasting signals which are sent out from television broadcasting stations.

The signal processing unit 23 carries out a predetermined signal processing such as demodulation/decoding and the like to the broadcasting signals and the like which are inputted from the signal receiving unit 22.

The switching unit 24 switches and selects data to be inputted by switching connection to either of the HDMI terminal provided at the communication unit 21 or the signal processing unit 23 in accordance with the control by the control unit 31, and outputs the data to the after-mentioned video processing unit 25, the audio processing unit 26 and the like.

The video processing unit 25 carries out various types of predetermined video processing to the video data inputted from the switching unit 24 to generate video signal and outputs the generated video signal to the display unit 28.

In particular, the video processing unit 25 is structured with LSI or the like, for example, and the video processing unit 25 carries out a scaling process in response to an instruction to the video data which is outputted from the switching unit 24 when the instruction to execute the scaling process is instructed by the control unit 31 of the video output apparatus 20.

Here, the video processing unit 25 may be structured so as to carry out various types of processing such as an image quality adjusting process other than the scaling process.

The audio processing unit 26 carries out various types of predetermined audio processing to audio data inputted from the switching unit 24 to generate audio signal and outputs the generated audio signal to the audio output unit 29.

The OSD circuit 27 carries out a process to combine OSD data (omitted from drawing) stored in the memory unit 312 or the like to the video data which is outputted to the display unit 28.

The display unit 28 display video based on the video data which is inputted from the video processing unit 25.

In particular, the display unit 28 includes a display (omitted from drawing) such as LCD (Liquid Crystal Display) or the like, for example, and the display unit 28 displays video based on the video data inputted from the video processing unit 25 and EPG (Electric Program Guide) on the display.

The audio output unit 29 outputs audio based on audio data inputted from the audio processing unit 26.

In particular, the audio output unit 29 includes a speaker (omitted from drawing) and the like, and the audio output unit 29 outputs audio based on audio data inputted from the audio processing unit 26 from the speaker.

The key operation unit 30 is used when a user inputs various types of instructions.

In particular, the key operation unit 30 includes a plurality of keys for a user to input various types of instructions, for example, and the key operation unit 30 outputs the input operation signal corresponding to the pushed key to the control unit 31 when a pushing operation of the key is carried out by a user.

The control unit 31 includes a CPU 311, a memory unit 312, a ROM 313 and the like.

The CPU 311 executes various types of programs which are stored in the ROM 313 according to the input signal inputted from each part of the video output apparatus 20, the input operation signal based on pushing operation of various types of keys in the key operation unit 30 and the like. Also, the CPU 311 integrally controls the entire operation of the video output apparatus 20 by outputting output signal to each part of the video output apparatus 20 based on the program for execution.

For example, the memory unit 312 includes a work area 312a formed of a volatile memory such as RAM or the like and a data area 312b formed of a non-volatile memory such as EPROM or the like.

The work area 312a stores processing results which occurs when various types of programs are executed by the CPU 311, inputted data and the like.

The data area 312b stores the between-pixel interpolation method table T2 which decides the superiority/inferiority of the between-pixel interpolation method used at the time of scaling process in the scaling process system 1.

The between-pixel interpolation method table T2 is structured in similar manner as the between-pixel interpolation method table T1 of the above described replay apparatus 10. Therefore, description of the between-pixel interpolation method table T2 will be omitted.

For example, the ROM 313 includes a program storage area formed of a non-volatile memory, and in particular, the ROM 313 stores the version request signal transmission program 313a, the version information receiving program 313b, the determining program 313c, the control program 313d, the between-pixel interpolation method table receiving program 313e, the update execution program 313f, the between-pixel interpolation method deciding program 313g and the like.

For example, the version request signal transmission program 313a is a program to make the CPU 311 realize a function to transmit the version request signal for requesting the version information of the between-pixel interpolation method table T1 of the replay apparatus 10 to the replay apparatus 10.

In particular, in time of carrying out the scaling process, the CPU 311 first executed the version request signal transmission program 313a to transmit the version request signal to the replay apparatus 10.

At this time, the CPU 311 transmits the request signal by using the CEC vendor command of HDMI.

The CPU 311 functions as the version request signal transmission device along with the communication unit 21 by executing the version request signal transmission program 313a.

For example, the version information receiving program 313b is a program to make the CPU 311 realize a function to receive the version information which is returned from the replay apparatus 10 in response to the version request signal.

In particular, when the version information is returned from the video output apparatus 20 by the execution of the version information return program 163b of the replay apparatus 10, the CPU 311 receives the version information of the between-pixel interpolation method table T1 of the replay apparatus 10 by executing the version information receiving program 313b.

The CPU 311 functions as the version information receiving device along with the communication unit 21 by executing the version information receiving program 313b.

For example, the determining program 313c is a program to make the CPU 311 realize a function to determine which of the between-pixel interpolation method table of the replay apparatus 10 or the between-pixel interpolation method table of the video output apparatus 20 is newer by comparing the version information of the between-pixel interpolation method table T1 of the replay apparatus 10 with the version information of the between-pixel interpolation method table T2 of the video output apparatus 20.

In particular, when the version information of the replay apparatus 10 is received by the execution of the version information receiving program 313b, the CPU 311 refers to the between-pixel interpolation method table T2 which is stored in the memory unit 312 to compare the version information of the between-pixel interpolation method table T1 with the version information of the between-pixel interpolation method table T2 and determines which is newer.

For example, as shown in FIG. 4, when the version information of the between-pixel interpolation method table T2 of the video output apparatus 20 is "Ver. 2", the CPU 311 determines that the video output apparatus 20 is provided with the between-pixel interpolation method table of newer version when the version information obtained from the replay apparatus 10 is "Ver. 1".

The CPU 311 functions as the determining device by executing the determining program 313c.

For example, the control program 313d is a program to make the CPU 311 realize a function to transmit either one of the between-pixel interpolation method table T2 of the video output apparatus 20 or the control signal for transmitting the between-pixel interpolation method table T1 of the replay apparatus 10 to the video output apparatus 20 to the replay apparatus 10.

In particular, when the between-pixel interpolation method table T2 of the video output apparatus 20 is determined as being newer by the execution of the determining program 313c, the CPU 311 transmits the between-pixel interpolation method table T2 of the video output apparatus 20 to the replay apparatus 10.

On the other hand, when the between-pixel interpolation method table T1 of the replay apparatus 10 is determined as being newer by the execution of the determining program 313c, the CPU 311 transmits the control signal for transmitting the between-pixel interpolation method table T1 of the replay apparatus 10 to the replay apparatus 10.

At this time, the CPU 311 transmits the between-pixel interpolation method table T2 or the control signal by using the CEC vendor command of HDMI.

The CPU 311 functions as the control device along with the communication unit 21 by executing the control program 313d.

For example, the between-pixel interpolation method table receiving program 313e is a program to make the CPU 311 realize a function to receive the between-pixel interpolation method table T1 which is transmitted from the replay apparatus 10 by executing the between-pixel interpolation method table transmission program 163d of the replay apparatus 10.

In particular, when the between-pixel interpolation method table T1 is transmitted from the replay apparatus 10 by the execution of the between-pixel interpolation method table transmission program 163d of the replay apparatus 10, the CPU 311 receives the version information of the between-pixel interpolation method table T1 of the replay apparatus 10 by executing the between-pixel interpolation method table receiving program 313e.

The CPU 311 stores the received between-pixel interpolation method table T1 in the data area 312b of the memory unit 312.

Further, at this time, the CPU 311 transmits the between-pixel interpolation method table T1 by using the CEC vendor command of HDMI.

The CPU 311 functions as the between-pixel interpolation method table receiving device along with the communication unit 21 by executing the between-pixel interpolation method table receiving program 313e.

For example, the update execution program 313f is a program to make the CPU 311 realize a function to execute the update of the existing between-pixel interpolation method table T2 by using the received between-pixel interpolation method table T1 when the between-pixel interpolation method table T1 is received from the replay apparatus 10 by executing the between-pixel interpolation method table receiving program 313e.

In particular, when the between-pixel interpolation method table T1 is received by executing the between-pixel interpolation method table receiving program 313e, the CPU 311 compares the between-pixel interpolation method table T1 with the existing between-pixel interpolation method table T2 to extract the methods which are not stored as the "between-pixel interpolation method type" of the between-pixel interpolation method table T2 among the "between-pixel interpolation method type" of the between-pixel interpolation method table T1, and adds the extracted methods to the "between-pixel interpolation method type" of the between-pixel interpolation method table T2. Thereafter, the CPU 311 reallocates the order of superiority of between-pixel interpolation methods in accordance with the regular order of superiority.

That is, the CPU 311 updates the table (between-pixel interpolation method table T2) of old version in accordance with the table (between-pixel interpolation method table T1) of new version.

The CPU 311 functions as the first update execution device by executing the update execution program 313f.

For example, the between-pixel interpolation method deciding program 313g is a program to make the CPU 311 realize a function to decide which of the replay apparatus 10 or the video output apparatus 20 is to be used for carrying out the scaling process.

In particular, when the between-pixel interpolation method table T1 and the between-pixel interpolation method table T2 become the same version by the execution of the update execution program 163e of the replay apparatus 10 or the update execution program 313f of the video output apparatus 20, the CPU 311 determines which of the between-pixel interpolation method of the replay apparatus 10 or the between-pixel interpolation method of the video output apparatus 20 is higher in the order of superiority by executing the following device deciding process. That is, the CPU 311 determines which of the replay apparatus 10 or the video output apparatus 20 has a higher scaling process performance.

First, the CPU 311 obtains the between-pixel interpolation method in which the identifier is checked in the between-pixel interpolation method table T1 as the between-pixel interpolation method information of the replay apparatus 10 from the replay apparatus 10.

In particular, the CPU 311 transmits the request signal for requesting the between-pixel interpolation method information indicating the between-pixel interpolation method to be used when carrying out the scaling process in the replay apparatus 10 to the replay apparatus 10. Then, the CPU 161 of the replay apparatus 10 replies to the request signal and extracts the between-pixel interpolation method in which the identifier is checked by referring to the between-pixel interpolation method table T1 which is stored in the data area 162b of the memory unit 162, and transmits the extracts between-pixel interpolation method as the between-pixel interpolation method information to the video output apparatus 20.

When the between-pixel interpolation method information is received from the replay apparatus 10, the CPU 311 refers to the memory unit 312 and compares the order of superiority of the obtained between-pixel interpolation method of the replay apparatus 10 with the order of superiority of the between-pixel interpolation method (that is, the between-pixel interpolation method of the video output apparatus 20) in which the identifier is checked in the between-pixel interpolation method table T2 to determine which of the between-pixel interpolation method of the replay apparatus 10 or the between-pixel interpolation method of the video output apparatus 20 is high-performance. Then, the CPU 311 decides the apparatus which stored the between-pixel interpolation method of higher order of superiority as the apparatus to be used for the scaling process.

Thereafter, the CPU 311 outputs the instruction signal for instructing the execution of the scaling process to the video processing unit 13 of the replay apparatus 10 and the video processing unit 25 of the video output apparatus 20.

For example, as shown in FIG. 5, when the between-pixel interpolation method of the replay apparatus 10 is "A" and when the between-pixel interpolation method "E" is selected in the between-pixel interpolation method table T2 of the video output apparatus 20, the order of superiority are A=1 and E=1. Therefore, the CPU 311 determines that the video output apparatus 20 has higher scaling process performance and decides the video output apparatus 20 as the device to be used for the scaling process.

Next, operation of the scaling process system 1 of the embodiment will be described.

Figure 6:
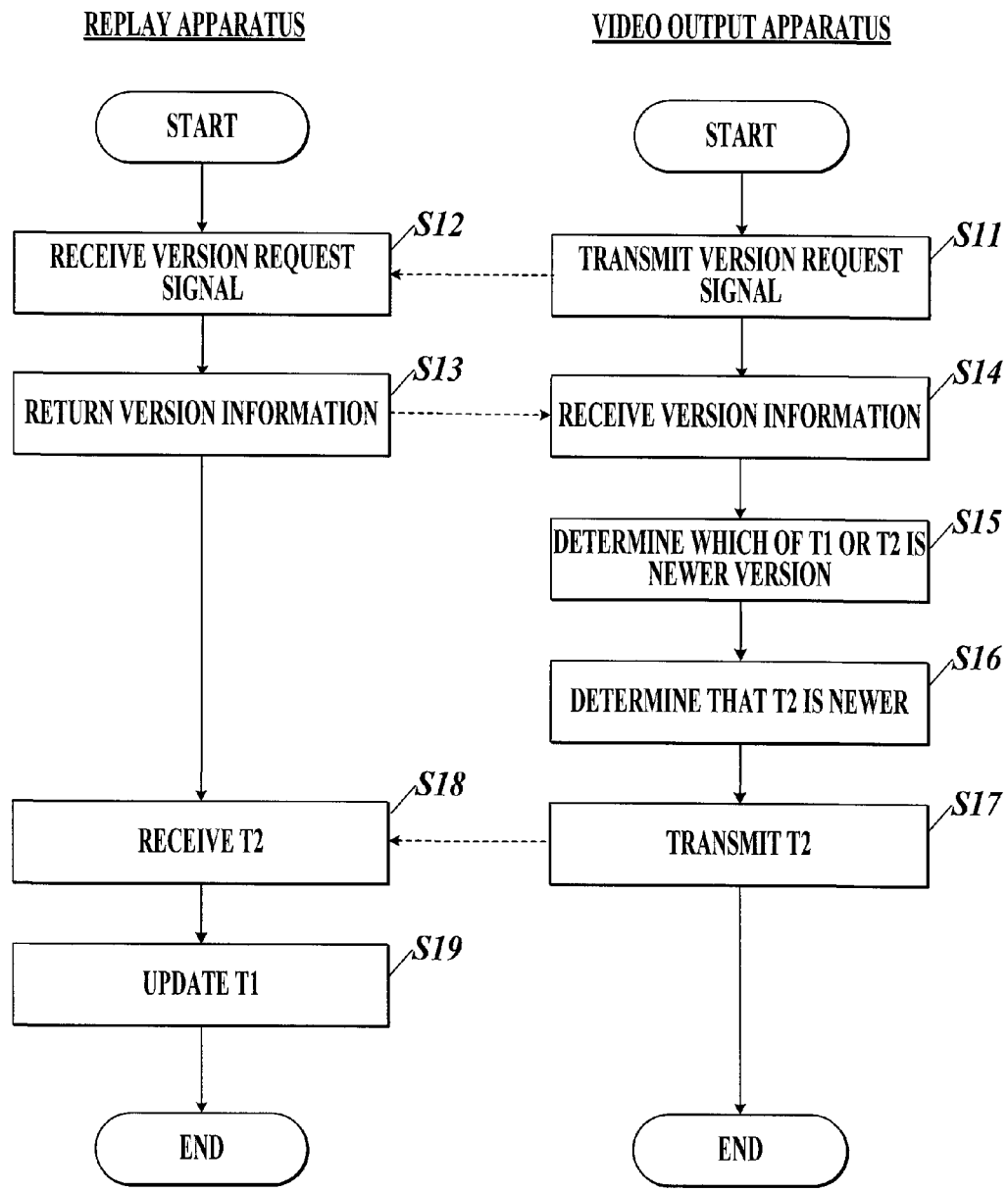
FIG. 6 is a flowchart showing an update process of the between-pixel interpolation method table which is carried out in the scaling process system of the first embodiment, and is showing a case where the between-pixel interpolation method table of the video output apparatus is newer version.
Figure 7:
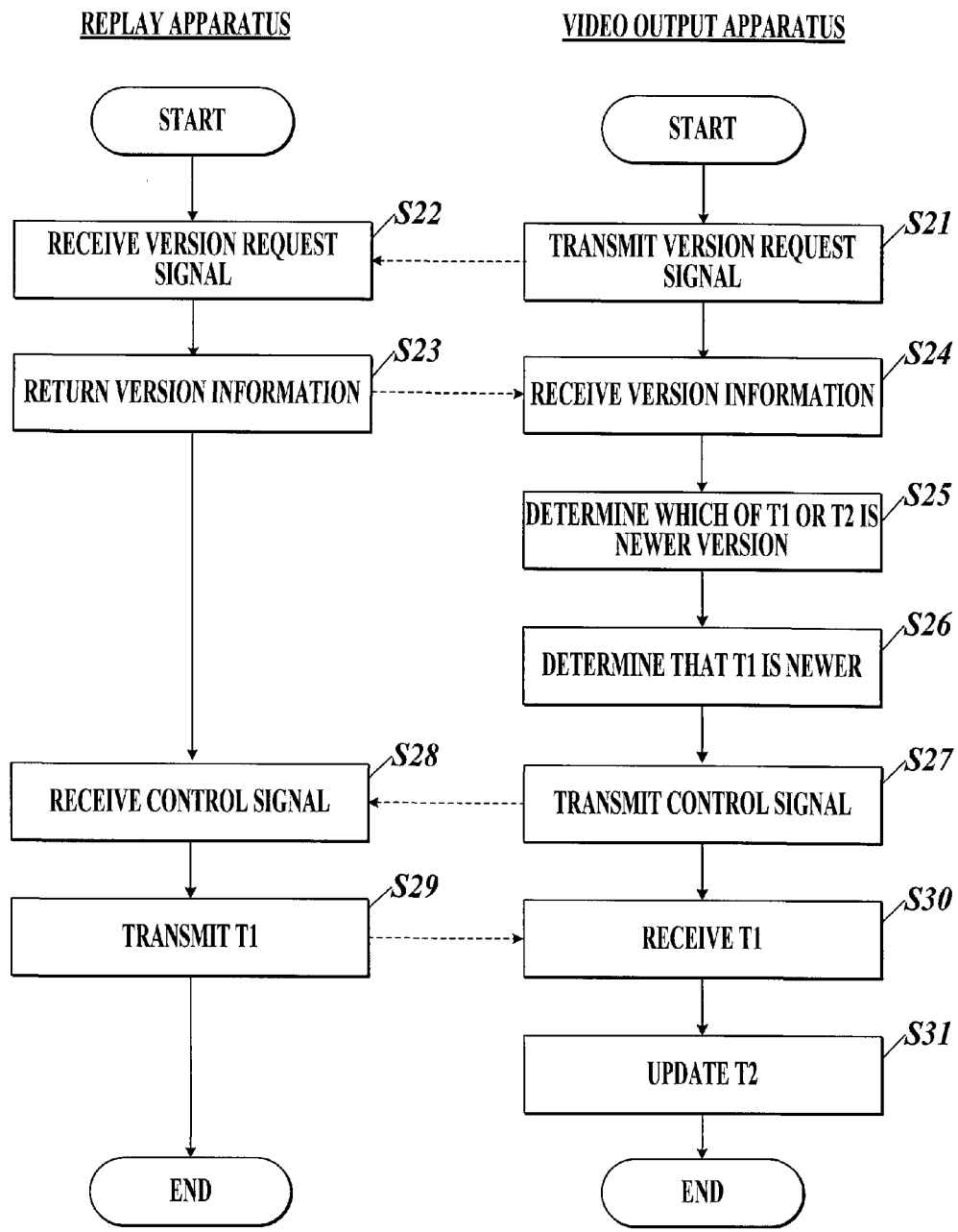
FIG. 7 is a flowchart showing an update process of the between-pixel interpolation method table which is carried out in the scaling process system of the first embodiment, and is showing a case where the between-pixel interpolation method table of the replay apparatus is newer version.

FIGS. 6 and 7 are flowcharts showing the update process of the between-pixel interpolation method table which is executed by the scaling process system 1 of the embodiment.

First, a case where the between-pixel interpolation method table T2 of the video output apparatus 20 is newer version will be described with reference to the flowchart of FIG. 6.

When the update process is started, first, the control unit 31 of the video output apparatus 20 transmits the version request signal for requesting the version information of the between-pixel interpolation method table T1 to the replay apparatus 10 via the communication unit 21 in step S11.

Next, in step S12, the control unit 16 of the replay apparatus 10 receives the version request signal which is transmitted from the video output apparatus 20 by the communication unit 14.

Next, in step S13, the control unit 16 of the replay apparatus 10 returns the version information of the between-pixel interpolation method table T1 to the video output apparatus 20 via the communication unit 14.

Next, in step S14, the control unit 31 of the video output apparatus 20 receives the version information of the between-pixel interpolation method table T1 which is returned from the replay apparatus 10 by the communication unit 21.

Next, in step S15, the control unit 31 of the video output apparatus 20 compares the version information of the between-pixel interpolation method table T1 of the replay apparatus 10 with the version information of the between-pixel interpolation method table T2 of the video output apparatus 20 to determine which of the between-pixel interpolation method tables is newer.

Next, in step S16, the control unit 31 of the video output apparatus 20 determines that the between-pixel interpolation method table T2 of the video output apparatus 20 is newer.

Next, in step S17, the control unit 31 of the video output apparatus 20 transmits the between-pixel interpolation method table T2 to the replay apparatus 10 via the communication unit 21.

Next, in step S18, the control unit 16 of the replay apparatus 10 receives the between-pixel interpolation method table T2 which is transmitted from the video output apparatus 20 by the communication unit 14.

Next, in step S19, the control unit 16 of the replay apparatus 10 updates the between-pixel interpolation method table T1 of the replay apparatus 10 by using the between-pixel interpolation method table T2, and the process is finished.

Next, a case where the between-pixel interpolation method table T1 of the replay apparatus 10 is newer version will be described with reference to the flowchart of FIG. 7.

Here, step S21 to step S25 in FIG. 7 are similar to step S11 to step S15 in the above FIG. 6, therefore descriptions will be omitted.

In step S26, the control unit 31 of the video output apparatus 20 determines that the between-pixel interpolation method table T1 of the replay apparatus 10 is newer.

Next, in step S27, the control unit 31 of the vide output apparatus 20 transmits the control signal for transmitting the between-pixel interpolation method table T1 to the video output apparatus 20 to the replay apparatus 10 via the communication unit 21.

Next, in step S28, the control unit 16 of the replay apparatus 10 receives the control signal which is transmitted from the video output apparatus 20 by the communication unit 14.

Next, in step S29, the control unit 16 of the replay apparatus 10 transmits the between-pixel interpolation method table T1 to the video output apparatus 20 via the communication unit 14.

Next, in step S30, the control unit 31 of the video output apparatus 20 receives the between-pixel interpolation method table T1 which is transmitted from the replay apparatus 10 by the communication unit 21.

Next, in step S31, the control unit 31 of the video output apparatus 20 updates the between-pixel interpolation method table T2 of the video output apparatus 20 by using the between-pixel interpolation method table T1, and the process is finished.

As described above, according to the scaling process system 1 of the embodiment, in the scaling process system 1 including the replay apparatus 10 and the video output apparatus 20 which are connected via HDMI, performance of each of the between-pixel interpolation method can be recognized by each other by making the between-pixel interpolation method tables of the replay apparatus 10 and the video output apparatus 20 be the same. Therefore, the device which is suitable for the scaling process can be determined appropriately.

Thus, the original image quality can be maintained in time of scaling process and even higher quality image can be realized.

Further, transmission and receiving of the between-pixel interpolation method tables T1 and T2 are carried out by the CEC vendor command of HDMI. Therefore, even a large amount of information can be handled and a prompt process can be realized.

Furthermore, the CEC of HDMI can be used for transmitting other information such as an extended definition function information, for example, other than the between-pixel interpolation method information.

Here, in the above described embodiment, it is structured that the video output apparatus 20 executes the device deciding process by the between-pixel interpolation method deciding program 313g. However, it may be structured that the between-pixel interpolation method deciding program 313g is provided in the replay apparatus 10 and that the device deciding process is executed by the replay apparatus 10.

That is, the structure may be that the update process of the between-pixel interpolation method table is executed by the video output apparatus 20 and that thereafter, the device deciding process is executed by the replay apparatus 10.

Second Embodiment

Next, the second embodiment of the present invention will be described centering around the points which are different from the first embodiment. Here, same symbols are used for the structures similar to that of first embodiment and the descriptions will be omitted.

The scaling process system 2 of the second embodiment includes the replay apparatus 10A and the video output apparatus 20B.

Figure 8:
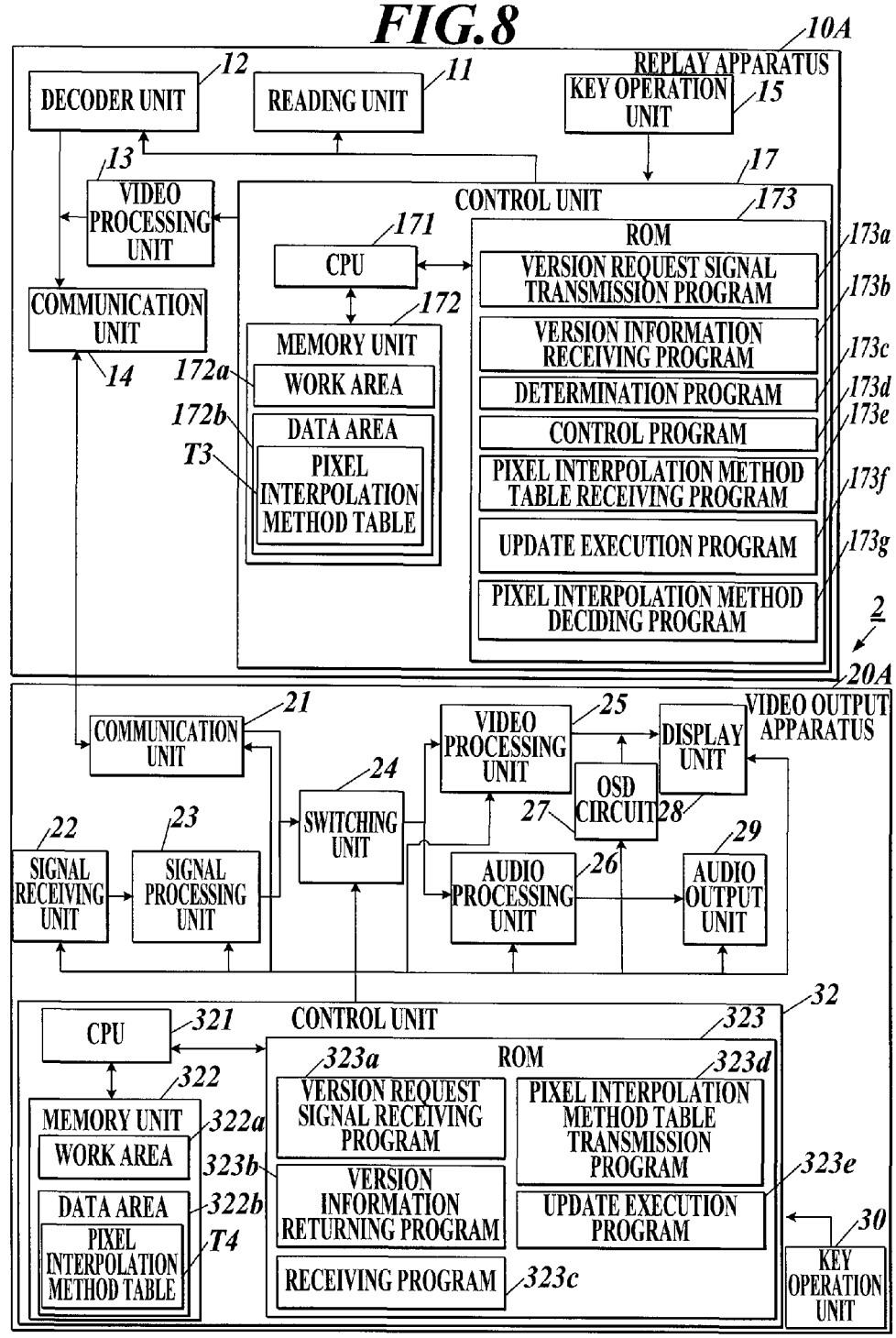
FIG. 8 is a block diagram showing a control structure of the replay apparatus and the video output apparatus in the scaling process system of the second embodiment.

As shown in FIG. 8, for example, the replay apparatus 10A includes the reading unit 11, the decoder unit 12, the video processing unit 13, the communication unit 14, the key operation unit 15, the control unit 17 to integrally control each of the above parts and the like.

The control unit 17 includes the CPU 171 for integrally controlling the entire operation of the replay apparatus 10A, the memory unit 172 having the work area 172a and the data area 172b, the ROM 173 having the program storage area and the like.

In the data area 172b of the memory unit 172, the between-pixel interpolation method table T3 is stored.

Here, the between-pixel interpolation method table T3 has a structure similar to the between-pixel interpolation method tables T1 and T2 of the first embodiment, therefore, detail description will be omitted.

For example, the version request signal transmission program 173a, the version information receiving program 173b, the determining program 173c, the control program 173d, the between-pixel interpolation method table receiving program 173e, the update execution program 173f, the between-pixel interpolation method deciding program 173g and the like are provided in the ROM 173.

Here, each of the version request signal transmission program 173a, the version information receiving program 173b, the determining program 173c, the control program 173d, the between-pixel interpolation method table receiving program 173e, the update execution program 173f and the between-pixel interpolation method deciding program 173g are for realizing the function similar to each of the version request signal transmission program 313a, the version information receiving program 313b, the determining program 313c, the control program 313d, the between-pixel interpolation method table receiving program 313e, the update execution program 313f and the between-pixel interpolation method determining program 313g in the first embodiment, respectively, therefore, detail descriptions will be omitted.

Moreover, the video output apparatus 20A includes the communication unit 21, the signal receiving unit 22, the signal processing unit 23, the switching unit 24, the video processing unit 25, the audio processing unit 26, the OSD circuit 27, the display unit 28, the audio output unit 29, the key operation unit 30, the control unit 32 to integrally control each of the above parts and the like.

The control unit 32 includes the CPU 321 to integrally control the entire operation of the video output apparatus 20A, the memory unit 322 having the work area 322a and the data area 322b, the ROM 323 having the program storage area and the like.

In the data are 322b of the memory unit 322, the between-pixel interpolation method table T4 is stored.

Here, the between-pixel interpolation method table T4 is similarly structured as the between-pixel interpolation method tables T1 and T2 of the first embodiment, therefore, detail description will be omitted.

For example, the version request signal receiving program 323a, the version information return program 323b, the receiving program 323c, the between-pixel interpolation method table transmission program 323d, the update execution program 323e and the like are provided in the ROM 323.

Here, each of the version request signal receiving program 323a, the version information return program 323b, the receiving program 323c, the between-pixel interpolation method table transmission program 323d and the update execution program 323e are for realizing functions similar to the version request signal receiving program 163a, the version information return program 163b, the receiving program 163c, the between-pixel interpolation method table transmission program 163d, the update execution program 163e of the first embodiment, respectively, therefore, detail descriptions will be omitted.

Figure 9:
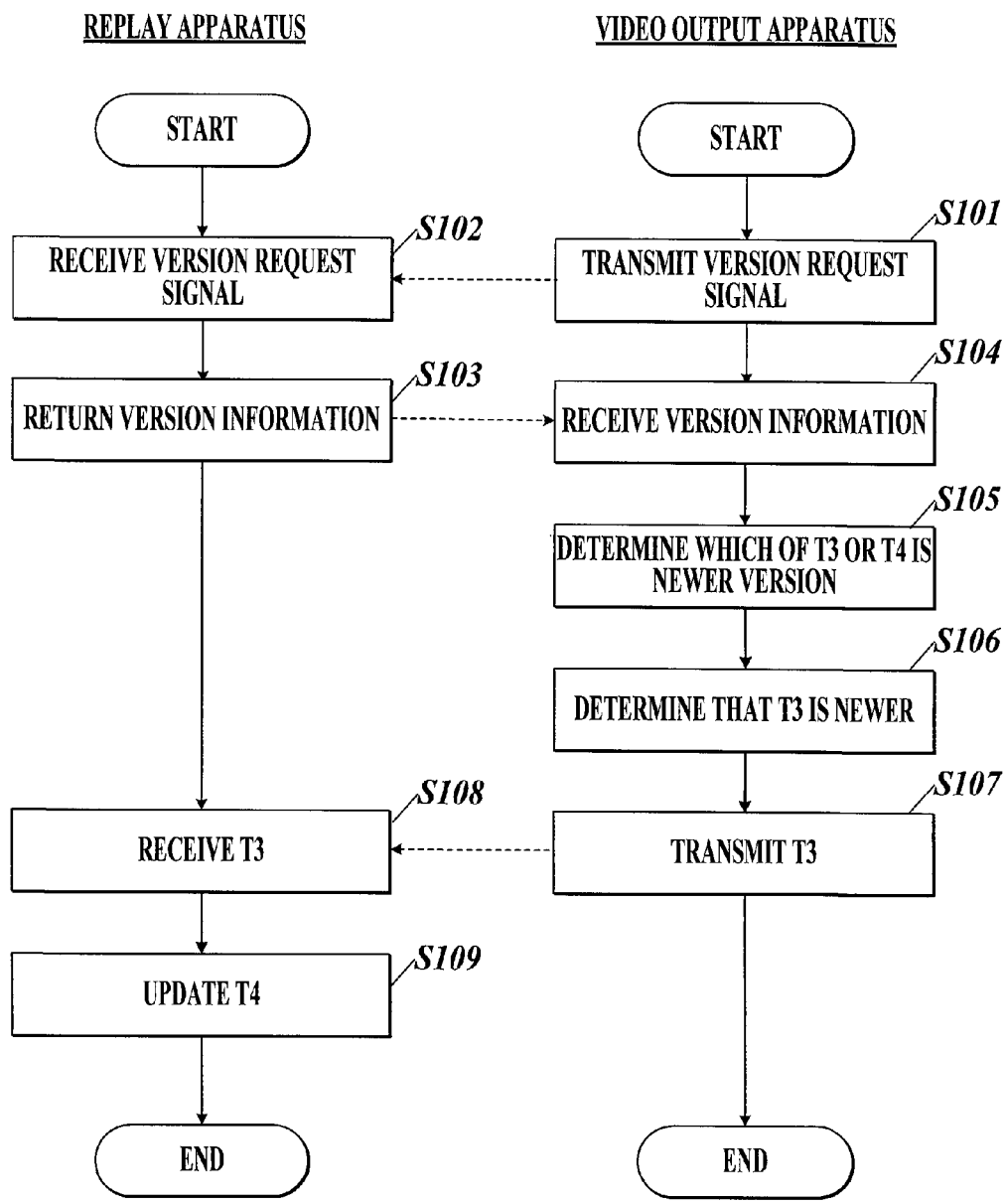
FIG. 9 is a flowchart showing an update process of the between-pixel interpolation method table which is carried out in the scaling process system of the second embodiment.
Figure 10:
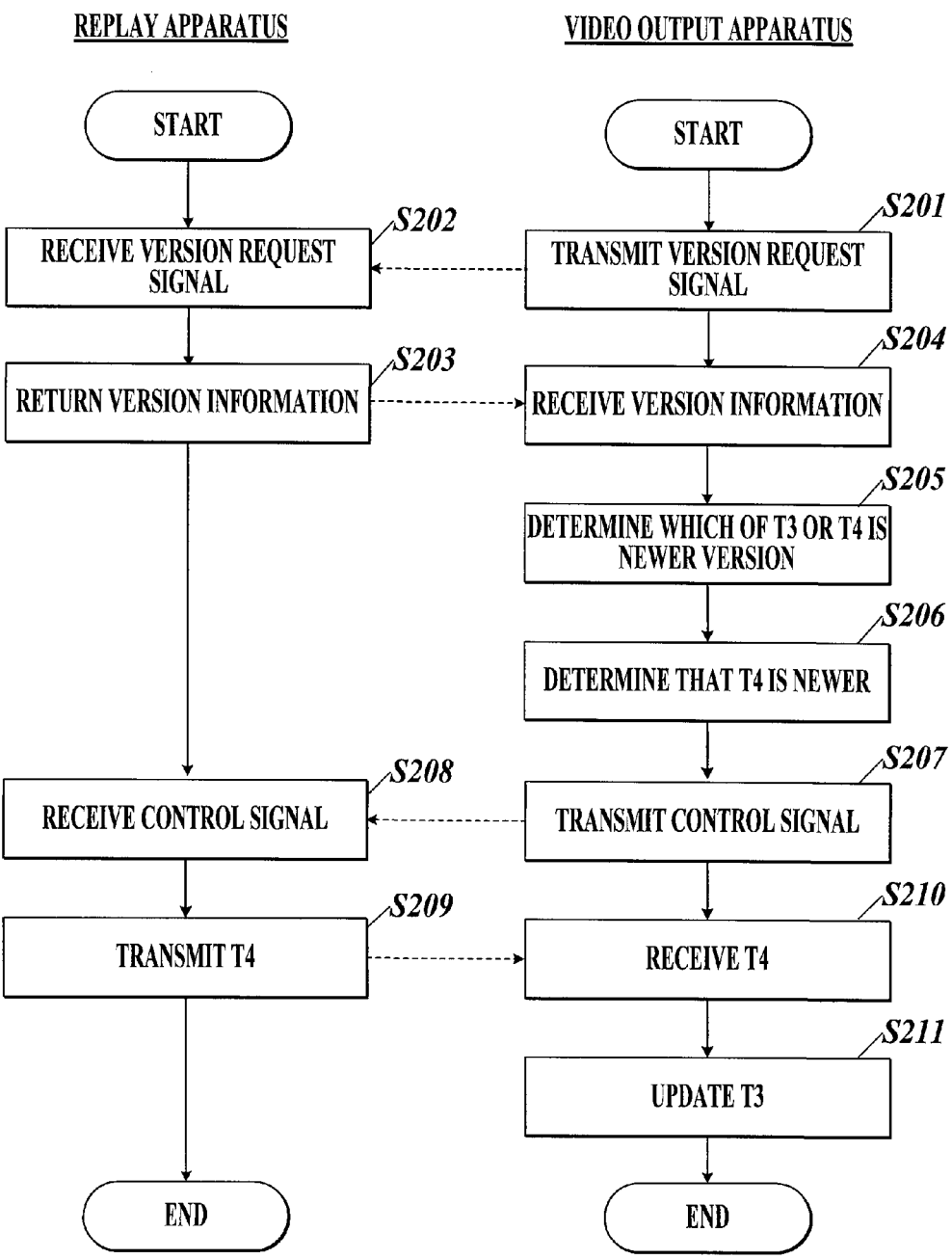
FIG. 10 is a flowchart showing an update process of the between-pixel interpolation method table which is carried out in the scaling process system of the second embodiment.

FIGS. 9 and 10 are flowcharts showing the device deciding process which is executed in the scaling process system 2 of the embodiment.

The flowchart of FIG. 9 describes a case where the between-pixel interpolation method table T3 of the replay apparatus 10A is newer version.

Here, steps S101, S104, S105, S106 and S107 in FIG. 9 are executed by the control unit 17 of the replay apparatus 10A, and the particular processing contents are similar to steps S11, S14, S15, S16 and S17 of FIG. 6 in the first embodiment, therefore, detail descriptions will be omitted.

Further, steps S102, S103, S108 and S109 in FIG. 9 are executed by the control unit 32 of the video output apparatus 20A, and the particular processing contents are similar to steps S12, S13, S18 and S19 of FIG. 6 in the first embodiment, therefore, detail descriptions will be omitted.

Furthermore, the flowchart of FIG. 10 describes a case where the between-pixel interpolation method table T4 of the video output apparatus 20A is newer version.

Here, steps S201, S204, S205, S206, S207, S210 and S211 in FIG. 10 are executed by the control unit 17 of the replay apparatus 10A, and the particular processing contents are similar to steps S21, S24, S25, S26, S27, S30 and S31 of FIG. 7 in the first embodiment, therefore, detail descriptions will be omitted.

Further, steps S202, S203, S208 and S209 in FIG. 10 are executed by the control unit 32 of the video output apparatus 20A, and the particular processing contents are similar to steps S22, S23, S28 and S29 of FIG. 7 in the first embodiment, therefore, detail descriptions will be omitted.

That is, in the scaling process system 2 of the embodiment, it is structured that the control unit 17 of the replay apparatus 10A transmits the version request signal and that the control unit 32 of the video output apparatus 20A replies to the version request signal. The replay apparatus 10A compares and judges the version information based on the reply from the video output apparatus 20A and determines the newer between-pixel interpolation method table, and executes the update process of the between-pixel interpolation method table based on the determination result. Thereafter, the control unit 17 of the replay apparatus 10A executes the device deciding process to decide the apparatus which stores the between-pixel interpolation method of higher order of superiority as the apparatus to be used for the scaling process.

Here, in the above embodiment, it is structured that the replay apparatus 10A executes the device deciding process by the between-pixel interpolation method deciding program 173g. However, the structure may be that the between-pixel interpolation method deciding program 173g is provided in the video output apparatus 20A and that the device deciding process is executed by the video output apparatus 20A.

That is, the structure may be that the update process of the between-pixel interpolation method table is executed by the replay apparatus 10A and thereafter, the device deciding process is executed by the video output apparatus 20A.

According to a first aspect of the preferred embodiments of the present invention, there is provided a scaling process system comprising a replay apparatus and a video output apparatus which are connected via a HDMI, wherein each of the video output apparatus and the replay apparatus respectively includes a between-pixel interpolation method table for deciding a superiority/inferiority of a between-pixel interpolation method which is used when carrying out a scaling process in the scaling process system, wherein the video output apparatus includes a version request signal transmission device to transmit a version request signal for requesting version information of the between-pixel interpolation method table of the replay apparatus to the replay apparatus, a version information receiving device to receive the version information of the between-pixel interpolation method table of the replay apparatus which is returned from the replay apparatus in response to the version request signal, a determining device to compare the version information of the between-pixel interpolation method table of the replay apparatus which is received by the version information receiving device with version information of the between-pixel interpolation method table of the video output apparatus to determine which of the between-pixel interpolation method table of the replay apparatus or the between-pixel interpolation method table of the video output apparatus is newer, a control device to transmit the between-pixel interpolation method table of the video output apparatus to the replay apparatus when the between-pixel interpolation method table of the video output apparatus is determined as being newer by the determining device and to transmit a control signal for transmitting the between-pixel interpolation method table of the replay apparatus to the video output apparatus to the replay apparatus when the between-pixel interpolation method table of the replay apparatus is determined as being newer by the determining device, a between-pixel interpolation method table receiving device to receive the between-pixel interpolation method table which is transmitted by the replay apparatus in response to the control signal and a first update execution device to execute an update of an existing between-pixel interpolation method table by using the received between-pixel interpolation method table when the between-pixel interpolation method table of the replay apparatus is received by the between-pixel interpolation method table receiving device, wherein the replay apparatus includes a version request signal receiving device to receive the version request signal which is transmitted by the version request signal transmission device of the video output apparatus, a version information return device to return the version information of the between-pixel interpolation method table of the replay apparatus in response to the version request signal to the video output apparatus, a receiving device to receive the between-pixel interpolation method table or the control signal which is transmitted by the control device, a between-pixel interpolation method table transmission device to transmit the between-pixel interpolation table to the video output apparatus when the control signal is received by the receiving device and a second update executing device to execute an update of an existing between-pixel interpolation method table by using the received between-pixel interpolation method table when the between-pixel interpolation method table of the video output apparatus is received by the receiving device.

According to a second aspect of the preferred embodiments of the present invention, there is provided a scaling process system comprising a replay apparatus and a video output apparatus which are connected via a HDMI, wherein each of the video output apparatus and the replay apparatus respectively includes a between-pixel interpolation method table for deciding a superiority/inferiority of a between-pixel interpolation method which is used when carrying out a scaling process in the scaling process system, wherein the replay apparatus includes a version request signal transmission device to transmit a version request signal for requesting version information of the between-pixel interpolation method table of the video output apparatus to the video output apparatus, a version information receiving device to receive the version information of the between-pixel interpolation method table of the video output apparatus which is returned from the video output apparatus in response to the version request signal, a determining device to compare the version information of the between-pixel interpolation method table of the video output apparatus which is received by the version information receiving device with version information of the between-pixel interpolation method table of the replay apparatus to determine which of the between-pixel interpolation method table of the video output apparatus or the between-pixel interpolation method table of the replay apparatus is newer, a control device to transmit the between-pixel interpolation method table of the replay apparatus to the video output apparatus when the between-pixel interpolation method table of the replay apparatus is determined as being newer by the determining device and to transmit a control signal for transmitting the between-pixel interpolation method table of the video output apparatus to the replay apparatus to the video output apparatus when the between-pixel interpolation method table of the video output apparatus is determined as being newer by the determining device, a between-pixel interpolation method table receiving device to receive the between-pixel interpolation method table which is transmitted by the video output apparatus in response to the control signal and a first update execution device to execute an update of an existing between-pixel interpolation method table by using the received between-pixel interpolation method table when the between-pixel interpolation method table of the video output apparatus is received by the between-pixel interpolation method table receiving device, wherein the video output apparatus includes a version request signal receiving device to receive the version request signal which is transmitted by the version request signal transmission device of the replay apparatus, a version information return device to return the version information of the between-pixel interpolation method table of the video output apparatus in response to the version request signal to the replay apparatus, a receiving device to receive the between-pixel interpolation method table or the control signal which is transmitted by the control device, a between-pixel interpolation method table transmission device to transmit the between-pixel interpolation table to the replay apparatus when the control signal is received by the receiving device and a second update executing device to execute an update of an existing between-pixel interpolation method table by using the received between-pixel interpolation method table when the between-pixel interpolation method table of the replay apparatus is received by the receiving device.

According to a third aspect of the preferred embodiments of the present invention, there is provided a video output apparatus which is connected with a replay apparatus via a HDMI, including a between-pixel interpolation method table to decide a superiority/inferiority of a between-pixel interpolation method which is used when carrying out a scaling process, a version request signal transmission device to transmit a version request signal for requesting version information of the between-pixel interpolation method table of the replay apparatus to the replay apparatus, a version information receiving device to receive the version information of the between-pixel interpolation method table of the replay apparatus which is returned from the replay apparatus in response to the version request signal, a determining device to compare the version information of the between-pixel interpolation method table of the replay apparatus which is received by the version information receiving device with version information of the between-pixel interpolation method table of the video output apparatus to determine which of the between-pixel interpolation method table of the replay apparatus or the between-pixel interpolation method table of the vide output apparatus is newer, a control device to transmit the between-pixel interpolation method table of the video output apparatus to the replay apparatus when the between-pixel interpolation method table of the video output apparatus is determined as being newer by the determining device and to transmit a control signal for transmitting the between-pixel interpolation method table of the replay apparatus to the video output apparatus to the replay apparatus when the between-pixel interpolation method table of the replay apparatus is determined as being newer by the determining device, a between-pixel interpolation method table receiving device to receive the between-pixel interpolation method table which is transmitted by the replay apparatus in response to the control signal and an update execution device to execute an update of an existing between-pixel interpolation method table by using the received between-pixel interpolation method table when the between-pixel interpolation method table of the replay apparatus is received by the between-pixel interpolation method table receiving device.

According to a fourth aspect of the preferred embodiments of the present invention, there is provided a replay apparatus which is connected with a video output apparatus via a HDMI, including a version request signal transmission device to transmit a version request signal for requesting version information of the between-pixel interpolation method table of the video output apparatus to the video output apparatus, a version information receiving device to receive the version information of the between-pixel interpolation method table of the video output apparatus which is returned from the video output apparatus in response to the version request signal, a determining device to compare the version information of the between-pixel interpolation method table of the video output apparatus which is received by the version information receiving device with version information of the between-pixel interpolation method table of the replay apparatus to determine which of the between-pixel interpolation method table of the video output apparatus or the between-pixel interpolation method table of the replay apparatus is newer, a control device to transmit the between-pixel interpolation method table of the replay apparatus to the video output apparatus when the between-pixel interpolation method table of the replay apparatus is determined as being newer by the determining device and to transmit a control signal for transmitting the between-pixel interpolation method table of the video output apparatus to the replay apparatus to the video output apparatus when the between-pixel interpolation method table of the video output apparatus is determined as being newer by the determining device, a between-pixel interpolation method table receiving device to receive the between-pixel interpolation method table which is transmitted by the video output apparatus in response to the control signal and an update execution device to execute an update of an existing between-pixel interpolation method table by using the received between-pixel interpolation method table when the between-pixel interpolation method table of the video output apparatus is received by the between-pixel interpolation method table receiving device.

The entire disclosure of Japanese Patent Application No. 2009-145357 filed on Jun. 18, 2009 including descriptions, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A scaling process system comprising a replay apparatus and a video output apparatus which are connected via a HDMI,
wherein each of the video output apparatus and the replay apparatus respectively comprises a between-pixel interpolation method table for deciding a superiority/inferiority of a between-pixel interpolation method which is used when carrying out a scaling process in the scaling process system,
wherein the video output apparatus comprises;
a version request signal transmission device to transmit a version request signal for requesting version information of the between-pixel interpolation method table of the replay apparatus to the replay apparatus,
a version information receiving device to receive the version information of the between-pixel interpolation method table of the replay apparatus which is returned from the replay apparatus in response to the version request signal,
a determining device to compare the version information of the between-pixel interpolation method table of the replay apparatus which is received by the version information receiving device with version information of the between-pixel interpolation method table of the video output apparatus to determine which of the between-pixel interpolation method table of the replay apparatus or the between-pixel interpolation method table of the video output apparatus is newer,
a control device to transmit the between-pixel interpolation method table of the video output apparatus to the replay apparatus when the between-pixel interpolation method table of the video output apparatus is determined as being newer by the determining device and to transmit a control signal for transmitting the between-pixel interpolation method table of the replay apparatus to the video output apparatus to the replay apparatus when the between-pixel interpolation method table of the replay apparatus is determined as being newer by the determining device,
a between-pixel interpolation method table receiving device to receive the between-pixel interpolation method table which is transmitted by the replay apparatus in response to the control signal, and
a first update execution device to execute an update of an existing between-pixel interpolation method table by using the received between-pixel interpolation method table when the between-pixel interpolation method table of the replay apparatus is received by the between-pixel interpolation method table receiving device,
wherein the replay apparatus comprises;
a version request signal receiving device to receive the version request signal which is transmitted by the version request signal transmission device of the video output apparatus, a version information return device to return the version information of the between-pixel interpolation method table of the replay apparatus in response to the version request signal to the video output apparatus, a receiving device to receive the between-pixel interpolation method table or the control signal which is transmitted by the control device, a between-pixel interpolation method table transmission device to transmit the between-pixel interpolation table to the video output apparatus when the control signal is received by the receiving device, and a second update executing device to execute an update of an existing between-pixel interpolation method table by using the received between-pixel interpolation method table when the between-pixel interpolation method table of the video output apparatus is received by the receiving device.

2. A scaling process system comprising a replay apparatus and a video output apparatus which are connected via a HDMI, wherein each of the video output apparatus and the replay apparatus respectively comprises a between-pixel interpolation method table for deciding a superiority/inferiority of a between-pixel interpolation method which is used when carrying out a scaling process in the scaling process system, wherein the replay apparatus comprises;

a version request signal transmission device to transmit a version request signal for requesting version information of the between-pixel interpolation method table of the video output apparatus to the video output apparatus, a version information receiving device to receive the version information of the between-pixel interpolation method table of the video output apparatus which is returned from the video output apparatus in response to the version request signal, a determining device to compare the version information of the between-pixel interpolation method table of the video output apparatus which is received by the version information receiving device with version information of the between-pixel interpolation method table of the replay apparatus to determine which of the between-pixel interpolation method table of the video output apparatus or the between-pixel interpolation method table of the replay apparatus is newer, a control device to transmit the between-pixel interpolation method table of the replay apparatus to the video output apparatus when the between-pixel interpolation method table of the replay apparatus is determined as being newer by the determining device and to transmit a control signal for transmitting the between-pixel interpolation method table of the video output apparatus to the replay apparatus to the video output apparatus when the between-pixel interpolation method table of the video output apparatus is determined as being newer by the determining device, a between-pixel interpolation method table receiving device to receive the between-pixel interpolation method table which is transmitted by the video output apparatus in response to the control signal, and a first update execution device to execute an update of an existing between-pixel interpolation method table by using the received between-pixel interpolation method table when the between-pixel interpolation method table of the video output apparatus is received by the between-pixel interpolation method table receiving device, wherein the video output apparatus comprises;

a version request signal receiving device to receive the version request signal which is transmitted by the version request signal transmission device of the replay apparatus, a version information return device to return the version information of the between-pixel interpolation method table of the video output apparatus in response to the version request signal to the replay apparatus, a receiving device to receive the between-pixel interpolation method table or the control signal which is transmitted by the control device, a between-pixel interpolation method table transmission device to transmit the between-pixel interpolation table to the replay apparatus when the control signal is received by the receiving device, and a second update executing device to execute an update of an existing between-pixel interpolation method table by using the received between-pixel interpolation method table when the between-pixel interpolation method table of the replay apparatus is received by the receiving device.

3. The scaling process system as claimed in claim 1, wherein the between-pixel interpolation method table transmission device transmits the between-pixel interpolation method table by a CEC vendor command of the HDMI, and the between-pixel interpolation method table receiving device receives the between-pixel interpolation method table by the CEC vendor command of the HDMI.

4. A video output apparatus which is connected with a replay apparatus via a HDMI, comprising:

a between-pixel interpolation method table to decide a superiority/inferiority of a between-pixel interpolation method which is used when carrying out a scaling process;

a version request signal transmission device to transmit a version request signal for requesting version information of the between-pixel interpolation method table of the replay apparatus to the replay apparatus, a version information receiving device to receive the version information of the between-pixel interpolation method table of the replay apparatus which is returned from the replay apparatus in response to the version request signal, a determining device to compare the version information of the between-pixel interpolation method table of the replay apparatus which is received by the version information receiving device with version information of the between-pixel interpolation method table of the video output apparatus to determine which of the between-pixel interpolation method table of the replay apparatus or the between-pixel interpolation method table of the vide output apparatus is newer, a control device to transmit the between-pixel interpolation method table of the video output apparatus to the replay apparatus when the between-pixel interpolation method table of the video output apparatus is determined as being newer by the determining device and to transmit a control signal for transmitting the between-pixel interpolation method table of the replay apparatus to the video output apparatus to the replay apparatus when the between-pixel interpolation method table of the replay apparatus is determined as being newer by the determining device, a between-pixel interpolation method table receiving device to receive the between-pixel interpolation method table which is transmitted by the replay apparatus in response to the control signal, and an update execution device to execute an update of an existing between-pixel interpolation method table by using the received between-pixel interpolation method table when the between-pixel interpolation method table of the replay apparatus is received by the between-pixel interpolation method table receiving device.

5. A replay apparatus which is connected with a video output apparatus via a HDMI, comprising:

a version request signal transmission device to transmit a version request signal for requesting version information of the between-pixel interpolation method table of the video output apparatus to the video output apparatus, a version information receiving device to receive the version information of the between-pixel interpolation method table of the video output apparatus which is returned from the video output apparatus in response to the version request signal, a determining device to compare the version information of the between-pixel interpolation method table of the video output apparatus which is received by the version information receiving device with version information of the between-pixel interpolation method table of the replay apparatus to determine which of the between-pixel interpolation method table of the video output apparatus or the between-pixel interpolation method table of the replay apparatus is newer, a control device to transmit the between-pixel interpolation method table of the replay apparatus to the video output apparatus when the between-pixel interpolation method table of the replay apparatus is determined as being newer by the determining device and to transmit a control signal for transmitting the between-pixel interpolation method table of the video output apparatus to the replay apparatus to the video output apparatus when the between-pixel interpolation method table of the video output apparatus is determined as being newer by the determining device, a between-pixel interpolation method table receiving device to receive the between-pixel interpolation method table which is transmitted by the video output apparatus in response to the control signal, and an update execution device to execute an update of an existing between-pixel interpolation method table by using the received between-pixel interpolation method table when the between-pixel interpolation method table of the video output apparatus is received by the between-pixel interpolation method table receiving device.

* * * * *